L. E. WATERMAN.
CORN PLANTER DRIVING MECHANISM.
APPLICATION FILED APR. 17, 1914.
1,159,443.
Patented Nov. 9, 1915.
2 SHEETS—SHEET 2.
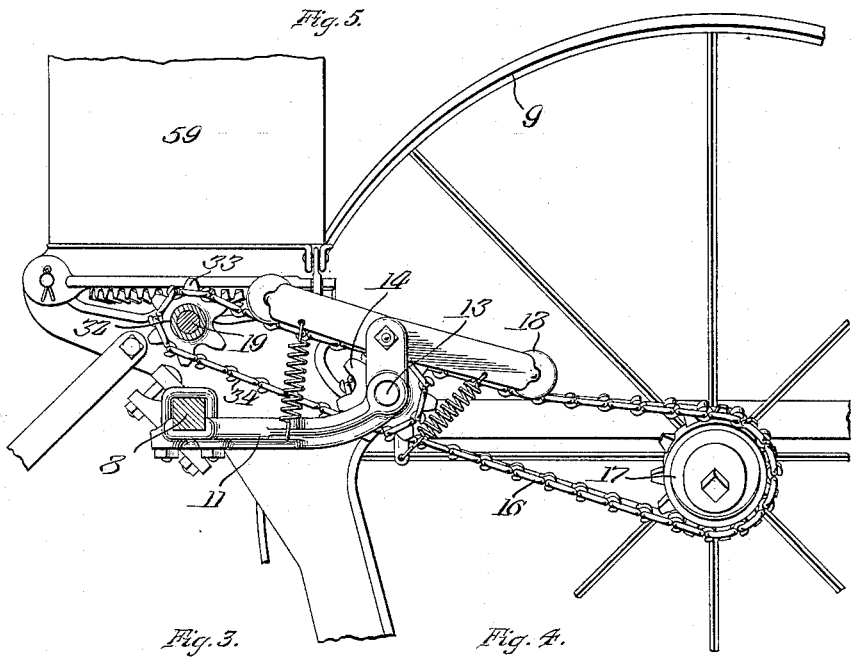
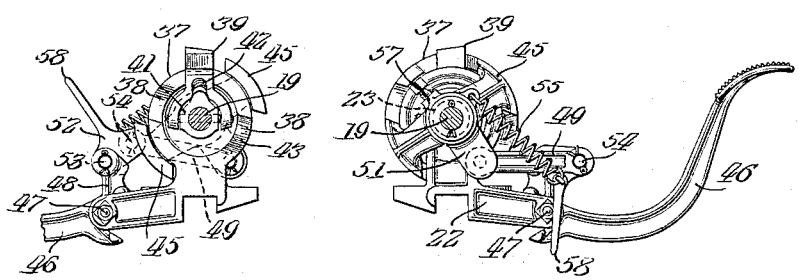
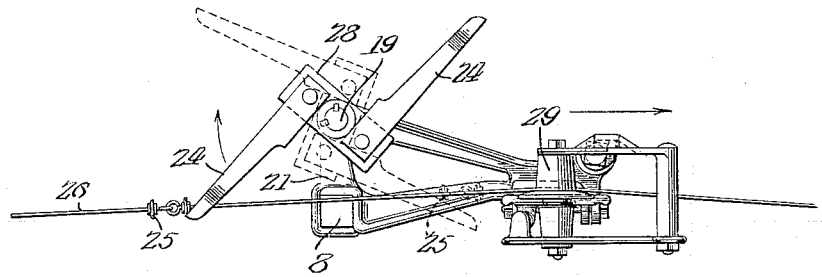

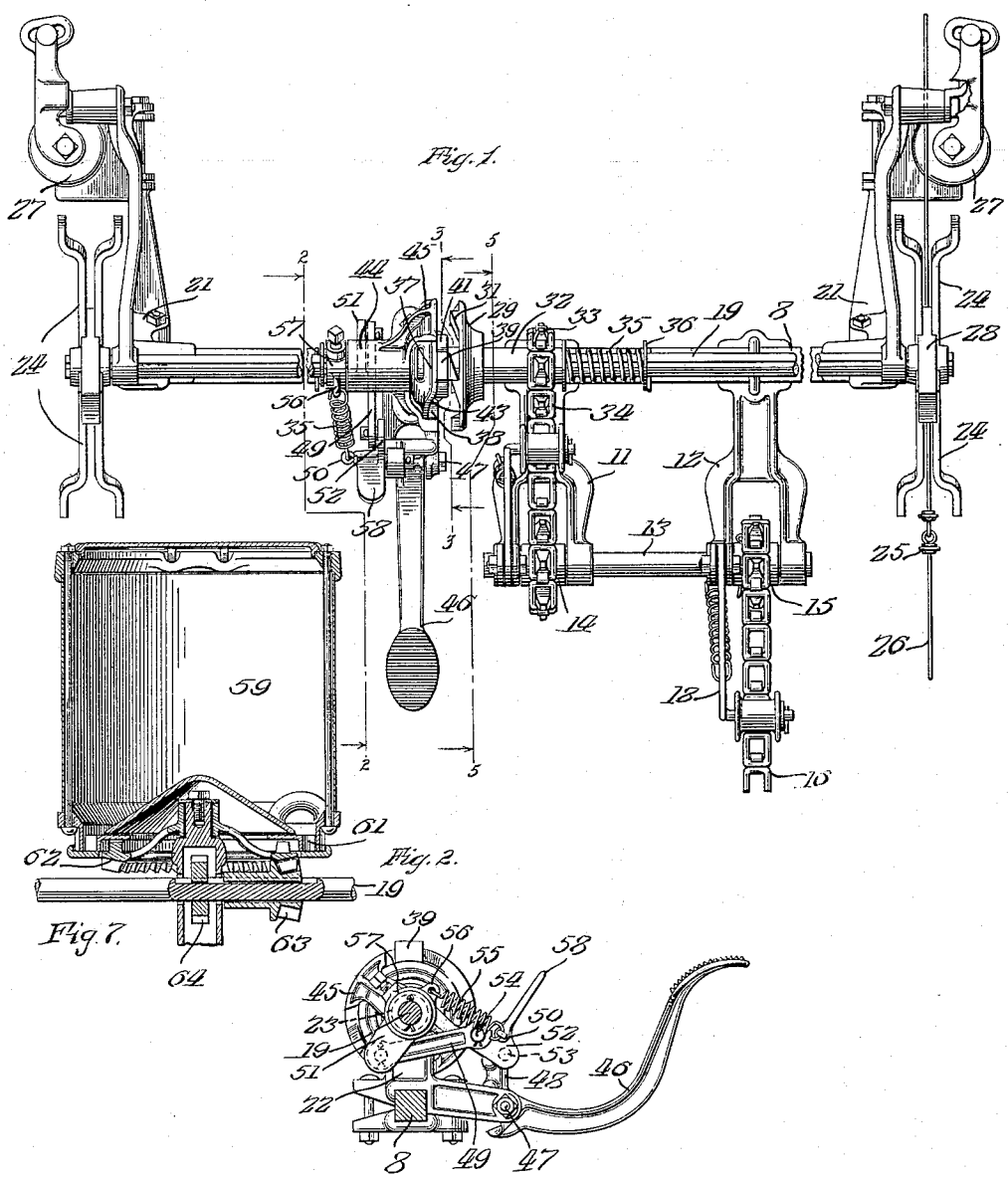

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

CORN-PLANTER DRIVING MECHANISM.

1,159,443.   Specification of Letters Patent.   Patented Nov. 9, 1915.

Application filed April 17, 1914. Serial No. 832,569.

*To all whom it may concern:*

Be it known that I, LEWIS E. WATERMAN, a citizen of the United States, residing at Rockford, in the county of Winnebago and State of Illinois, have invented certain new and useful Improvements in Corn-Planter Driving Mechanism, of which the following is a specification.

This invention pertains in general to corn planters and is concerned more particularly with the driving mechanism for operating the seed dropping mechanism.

One of the primary objects of the present invention is the provision of a single cross-shaft, by means of which power is transmitted from the driving wheels to the dropping mechanism and upon which the check-forks are mounted.

Another object is to provide check-forks of novel construction, and to equip each end of the shaft with two oppositely disposed forks so that upon each actuation of the cross-shaft, initiated by the engagement of the check-wire with a check-fork, the shaft will be rotated one-half a revolution.

Another object of the invention is to provide improved mechanism for operating the cross-shaft so that after the initial rotation has been imparted thereto by a check-fork, the shaft will be thrown into engagement with the driving mechanism from which the shaft will be directly driven during the remainder of its semirevolution.

A further object is to provide a novel foot operated mechanism, by means of which the dropping mechanism may be intermittently operated when the check row wire is not in use.

A still further object is the provision of novel controlling or adjusting mechanism, by means of which the planter may be converted from a hill to a drill machine and vice versa.

Additional objects and advantages of my present invention will be clearly apparent from the following description when considered in connection with the accompanying drawings.

Referring to the drawings, Figure 1 is a fragmentary plan view of a corn planter driving mechanism embodying my invention. Fig. 2 is a transverse view taken on the line 2—2 of Fig. 1. Fig. 3 is a similar view taken on the line 3—3 of Fig. 1. Fig. 4 is a view similar to Fig. 2, showing the controlling mechanism adjusted to drilling position. Fig. 5 is a view substantially on the line 5—5 of Fig. 1, showing also the position of a seed box and a drive-wheel. Fig. 6 is an end elevation showing the check-forks and check-wire guiding mechanism; and Fig. 7 is a vertical sectional view through one of the seed boxes, and driving connections therefor.

On the drawings, reference character 8 designates generally the main frame of the machine, which is preferably of the general construction disclosed in my companion application Ser. No. 832,568, filed April 17, 1914, the frame being carried upon the usual supporting wheels, one of which is partially shown in Fig. 5 and indicated by reference character 9. A pair of brackets 11 and 12, supported from the frame 8, carry at their rear ends a countershaft 13 equipped with the sprocket wheels 14 and 15, as shown in Fig. 1. The shaft is driven by a drive chain 16 engaged with the sprocket wheel 15 and with a sprocket wheel 17 mounted on the hub of the drive-wheel 9. A spring actuated chain tightener 18 serves to maintain the required tension upon the chain.

A cross-shaft 19 mounted above the frame 8 in suitable supporting brackets, includes an upwardly extending bracket 21 adjacent each end of the shaft, and an intermediate bracket 22 having a bearing sleeve 23. Each end of the shaft 19 is equipped with a pair of check-forks 24, each adapted to be engaged and operated by the tappets 25 on a check-wire 26, the wire being guided to the check-forks through the instrumentality of suitable guiding means designated generally by reference character 27, and which may be of any well known or preferred construction. The check-forks are each rigidly attached to a head 28, fixed on the shaft 19, and are normally disposed in the position shown on dotted lines in Fig. 6. When a tappet on the check-wire is brought into operative relation with the lower fork, an initial rotative movement is imparted to the shaft 19 by the fork in a clock-wise direction viewing Fig. 6. This initial movement being adapted to connect the shaft 19 with the continuously rotating countershaft 13, by mechanism which will be later described, so that the remainder of the half revolution of the cross-shaft is effected directly from the driving wheel.

A ratchet member or wheel 29, having ratchet teeth 31 on its inner face, is fixed on a sleeve 32 loosely mounted on the shaft 19 and provided with a sprocket wheel 33 from which the ratchet member is continuously rotated through the chain 34 trained over the sprocket wheels 14 and 33. A coiled expansion spring 35 abutting at one end against the sleeve 32, and at its other end against a washer or flange 36, on the shaft, normally urges the sleeve toward the left, viewing Fig. 1. The bracket 22, carrying the sleeve 23, through which the shaft 19 extends, is formed to provide an annular member 37 opposed to the ratchet teeth of the ratchet member 29. The member 37 being provided at diametrically opposite positions with depressions 38 adapted to receive a dog 39 pivoted on a member 41 fixed on the shaft 19, the dog being mounted so as to move longitudinally about its pivot with respect to the shaft, but so as to be incapable of rotative movement with respect to the shaft. A coiled expansion spring 42 normally urges the dog against the face of the member 37, and when upon rotation of the shaft and the dog therewith, said dog comes opposite to one of the depressions 38, the spring will cause the dog to drop into said depression, whereupon rotation of shaft 19 will cease. When the dog is seated in one of the depressions 38, the check-forks will be in the position shown by dotted line in Fig. 6. Initial rotative movement of the shaft 19 by a check-fork will cause the dog 39 to travel over the cam face 43 of the depression 38, thereby bringing the dog into the path of travel of the ratchet teeth 31 which will engage with the dog and continue the rotation of shaft 19 until, when a half revolution of the shaft has been completed, the dog will be brought opposite to the other depression into which it will be forced by the spring 42 to disconnect the shaft from the continuously rotating ratchet wheel. At each actuation of a check-fork this operation is repeated.

It is frequently desirable to operate the dropping mechanism by hand or by foot, so that the seeds may be planted at the ends of the rows where the check-wire will not operate; with this end in view, I have journaled upon the sleeve 23 a sleeve member 44 having sector ends 45 disposed in the plane of the face of member 37. A foot-operated bellcrank lever 46 is pivoted at 47 on the bracket 22, and the upwardly extending arm 48 of the lever is connected by link 49 with an arm 51 integral with the sleeve member 44, through the intermediary of a latch device 52 pivoted at 53 on said arm 48 and at 54 to the link 49.

Assuming that the parts are in the positions shown in Figs. 1 and 2, the sector ends 45 are positioned just at the rear of the depressions 38 in the face of the member 37. When the foot lever 46 is depressed, the sleeve member 44 will be swung in a counter clock-wise direction viewing Fig. 2, or in a clock-wise direction viewing Fig. 3, to engage with the dog 39 and move it along the cam surface 43 into position to be engaged by the teeth 31 of the member 29. A contraction spring 55, attached at one end to a boss 56, projecting from a ring 57 secured on the sleeve 23, and at its other end to a boss 50, projecting laterally from the member 52, serves to return the foot lever and the sector member to normal inoperative position after each operation. It will be manifest that each depression of the foot lever will connect the shaft 19 with the continuously operating driving mechanism in the same manner that it is connected upon actuation of a check-fork.

In order to convert the planter from a hill to a drill machine, it is only necessary to turn the member 52, by means of the handle 58, from the position shown in Fig. 2 to that shown in Fig. 4, this movement serving to rotate the sleeve member 44 sufficiently to dispose the sector ends 45 over the depressions 38. In this position of the parts the spring 55 serves to prevent return movement and to hold the sector members over the depressions 38, with the result that the dog 39 is continuously engaged by the ratchet teeth 31 and a continuous rotation is imparted to the shaft 19. It will thus be evident that the machine may be readily converted from a check-row planter to a drill planter, and vice versa, and that the dropping mechanism may be actuated by hand or by foot power when desired.

The seed boxes 59, one of which is shown in the drawings, are equipped with the usual seed plates 61, adapted to be rotated from a gear 62 meshing with a pinion 63 splined on the shaft 19; this construction is well known and forms no part of my present invention. The dropping mechanism may be operated from the pinion 64 in the usual manner.

I claim as my invention:

1. In a corn planter, the combination of seed dropping mechanism, a continuously rotating member, a clutch device for connecting the seed dropping mechanism with the rotating member, means including a manually operable lever for operating the clutch and having a permanent connection between its manually operable lever member and the clutch device, said connection including a second manually operable lever which may be operated independently of the first named lever and render the same inoperative.

2. In a corn planter the combination of seed dropping mechanism, a continuously rotating member, a clutch device for connecting the seed dropping mechanism with the rotating member, means including a manually operable lever for operating the clutch and having a permanent connection between its manually operable lever member and the clutch device, said connection including a second manually operable lever, either of said levers being operable to render the clutch device operative.

3. In a corn planter the combination of seed dropping mechanism, a continuously rotating member, a clutch device for connecting the seed dropping mechanism with the rotating member, means including a manually operable lever for operating the clutch and having a permanent connection between its manually operable lever member and the clutch device, said connection including a second manually operable lever which may be operated independently of the first named lever and render the same inoperative, and which when operated will automatically lock the clutch operative.

4. In a corn planter the combination of seed dropping mechanism, a continuously rotating member, a clutch device for connecting the seed dropping mechanism with the rotating member, a bell-crank lever one arm of which is manually operable, a separate arm-member connected with said clutch device and adapted to be oscillated to render the same operative, and a connection between said arm-member and the other arm of the bell-crank lever including a latch device for oscillating said clutch-arm independently of operation of the bell-crank lever for rendering the said clutch device operative.

5. In a corn planter the combination of seed dropping mechanism, a continuously rotating member, a clutch device for connecting the seed dropping mechanism with the rotating member, a manually operable lever controlled means for operating the clutch, the connection between the manually operable lever of said means and the clutch device including a link having a manually operable extension, the link being so arranged in said connection that it may be operated by said extension member to render the clutch device operative and to simultaneously lock the clutch device in its operative position.

LEWIS E. WATERMAN.

Witnesses:
 R. A. HEMENWAY,
 A. C. DENISON.

Copies of this patent may be obtained for five cents each, by addressing the "Commissioner of Patents, Washington, D. C."